(12) United States Patent
Messely et al.

(10) Patent No.: US 11,030,775 B2
(45) Date of Patent: Jun. 8, 2021

(54) MINIMAL USER INPUT VIDEO ANALYTICS SYSTEMS AND METHODS

(71) Applicant: FLIR Systems, Inc., Wilsonville, OR (US)

(72) Inventors: Pieter Messely, Ronse (BE); Dwight T. Dumpert, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 86 days.

(21) Appl. No.: 15/456,074

(22) Filed: Mar. 10, 2017

(65) Prior Publication Data

US 2017/0270689 A1    Sep. 21, 2017

Related U.S. Application Data

(60) Provisional application No. 62/309,956, filed on Mar. 17, 2016.

(51) Int. Cl.
| | |
|---|---|
| *G06T 7/80* | (2017.01) |
| *H04N 5/232* | (2006.01) |
| *H04N 7/18* | (2006.01) |
| *G06T 7/70* | (2017.01) |
| *G06T 7/20* | (2017.01) |

(52) U.S. Cl.
CPC .................. *G06T 7/80* (2017.01); *G06T 7/20* (2013.01); *G06T 7/70* (2017.01); *H04N 5/23293* (2013.01); *H04N 7/183* (2013.01); *G06T 2207/10016* (2013.01)

(58) Field of Classification Search
CPC .... G06T 7/80; G06T 7/70; G06T 7/20; G06T 2207/10016; H04N 5/23293; H04N 7/183
USPC .......................................................... 348/143
See application file for complete search history.

(56) References Cited

U.S. PATENT DOCUMENTS

| | | | |
|---|---|---|---|
| 8,259,174 B2 | 9/2012 | Zhang et al. | |
| 2004/0113917 A1* | 6/2004 | Matsumoto | ............... G06T 7/70 345/589 |
| 2007/0019865 A1* | 1/2007 | Owechko | ............. G06K 9/6229 382/224 |
| 2010/0026802 A1* | 2/2010 | Titus | ................ G08B 13/19608 348/143 |
| 2012/0062732 A1* | 3/2012 | Marman | ................... H04N 7/18 348/142 |
| 2013/0342700 A1 | 12/2013 | Kass | |
| 2014/0168445 A1* | 6/2014 | Hogasten | ................. H04N 5/33 348/164 |
| 2015/0093035 A1 | 4/2015 | Saptharishi et al. | |

* cited by examiner

*Primary Examiner* — Matthew K Kwan
(74) *Attorney, Agent, or Firm* — Haynes and Boone, LLP

(57) ABSTRACT

Various techniques are disclosed for calibrating surveillance camera systems with minimal user input. Such surveillance camera calibration techniques may be implemented in accordance with embodiments of the present disclosure to facilitate calibration and parameter configuration such that a surveillance camera can be installed and set up for video analytics with minimal input from a user without technical training or knowledge.

20 Claims, 14 Drawing Sheets

Determining Correlations Between Image Sizes Of A Tracked Object And Image Locations Calibrating Technique Used By Surveillance Camera System Determining Correlations Between Image Sizes Of A Tracked Object And Image Locations Display Screen Indicating A Successful Calibration Surveillance Camera System Calibration Technique Surveillance Camera System Calibration Technique

MINIMAL USER INPUT VIDEO ANALYTICS SYSTEMS AND METHODS

CROSS-REFERENCE TO RELATED APPLICATIONS

This application claims the benefit of and priority to U.S. Provisional Patent Application No. 62/309,956 filed Mar. 17, 2016 and entitled "MINIMAL USER INPUT VIDEO ANALYTICS SYSTEMS AND METHODS," which is incorporated herein by reference in its entirety.

TECHNICAL FIELD

One or more embodiments of the invention relate generally to imaging devices and more particularly, for example, to surveillance camera systems and methods with video analytics capabilities.

BACKGROUND

Some surveillance camera systems provide video analytics capabilities, such as automatic detection and/or tracking of persons, vehicles, and/or other objects of interest that enter the field-of-view (FOV) of the surveillance cameras. However, those surveillance camera systems typically require involvement of persons (e.g., engineers) with knowledge and experience in video analytics or other image processing technology to configure them properly during installation (known as calibration) in order for video analytics to be performed accurately as intended.

For example, when a surveillance camera for video analytics is installed at a certain location, the camera (e.g., the video analytics operations to be performed for the camera) typically requires calibration to correlate the real-world scene with the captured images, such as to determine the sizes and/or aspect ratios of objects of interest (e.g., persons, vehicles) as they appear in the captured images so that detection of those objects of interest can be performed accurately during video analytics operations. Such calibration requires engineers or other persons with knowledge to measure, calculate, input, and otherwise provide various parameters, such as the installation height, the look-down angle, and the focal length of the camera, before video analytics can be performed properly.

In addition to calibration, video analytics operations typically require configuration of various parameters in order to function properly as intended. Examples of the various parameters to be configured include tolerances, hysteresis parameters, and thresholds associated with object sizes, detection distances, detection conditions, object segmentation, and other aspects of video analytics operations, which may require technical knowledge and experience in video analytics and image processing to configure properly.

Such shortcomings of conventional surveillance camera systems make them inconvenient, time-consuming, and costly for setting up such systems. Thus, there is a need for improved surveillance camera calibration techniques.

SUMMARY

Various embodiments of the methods and systems disclosed herein may be used to calibrate surveillance camera systems with minimal user input. Such surveillance camera calibration techniques may be implemented in accordance with embodiments of the present disclosure to facilitate calibration and parameter configuration such that a surveillance camera can be installed and set up for video analytics with minimal input from a user without technical training or knowledge.

In one aspect, for example, a surveillance camera system according to one or more embodiments of the disclosure may include: an imaging sensor configured to generate video image frames of a scene; and a logic device communicatively coupled to the imaging sensor and configured to track an object captured in the video image frames, determine a correlation between a plurality of image locations in the video image frames and corresponding image sizes of the tracked object, and perform video analytics based on the correlation between the image locations and the corresponding imaged sizes of the object. In this regard, a surveillance camera system in one or more embodiments can provide automatic calibration for video analytics, since the estimated imaged sizes for objects of a certain type as they appear in different image locations can be learned and used in video analytics.

In another aspect, a surveillance camera system according to one or more embodiments of the disclosure may allow users to configure video analytics operations through fewer parameters. For example, the logic device may be configured to receive a user input for a master parameter for the video analytics, and adjust one or more video analytics parameters in response to the master parameter. Thus, a user can configure video analytics operations through the master parameter, since various video analytics parameters are automatically adjusted based on the master parameter or given default values.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Various embodiments of the methods and systems disclosed herein may be used to calibrate surveillance camera systems with minimal user input. Such surveillance camera calibration techniques may be implemented in accordance with embodiments of the present disclosure to facilitate calibration and parameter configuration such that a surveillance camera can be installed and set up for video analytics with minimal input from a user without technical training or knowledge.

In one aspect, for example, a surveillance camera system according to one or more embodiments of the disclosure may include an imaging sensor configured to generate multiple video image frames of a scene and a logic device communicatively coupled to the imaging sensor and configured to track an object captured in the video image frames, determine a correlation between a plurality of image locations in the video image frames and corresponding image sizes of the tracked object, and perform video analytics based on the correlation between the image locations and the corresponding imaged sizes of the object. In this regard, a surveillance camera system in one or more embodiments can provide automatic calibration for video analytics, since the estimated imaged sizes for objects of a certain type as they appear in different image locations can be learned and used in video analytics.

In another aspect, a surveillance camera system according to one or more embodiments of the disclosure may allow users to configure video analytics operations through fewer parameters. For example, the logic device may be configured to receive a user input for a master parameter for the video analytics, and adjust one or more video analytics parameters in response to the master parameter. Thus, a user can configure video analytics operations through the master parameter, since various video analytics parameters are automatically adjusted based on the master parameter or given default values.

Figure 1:
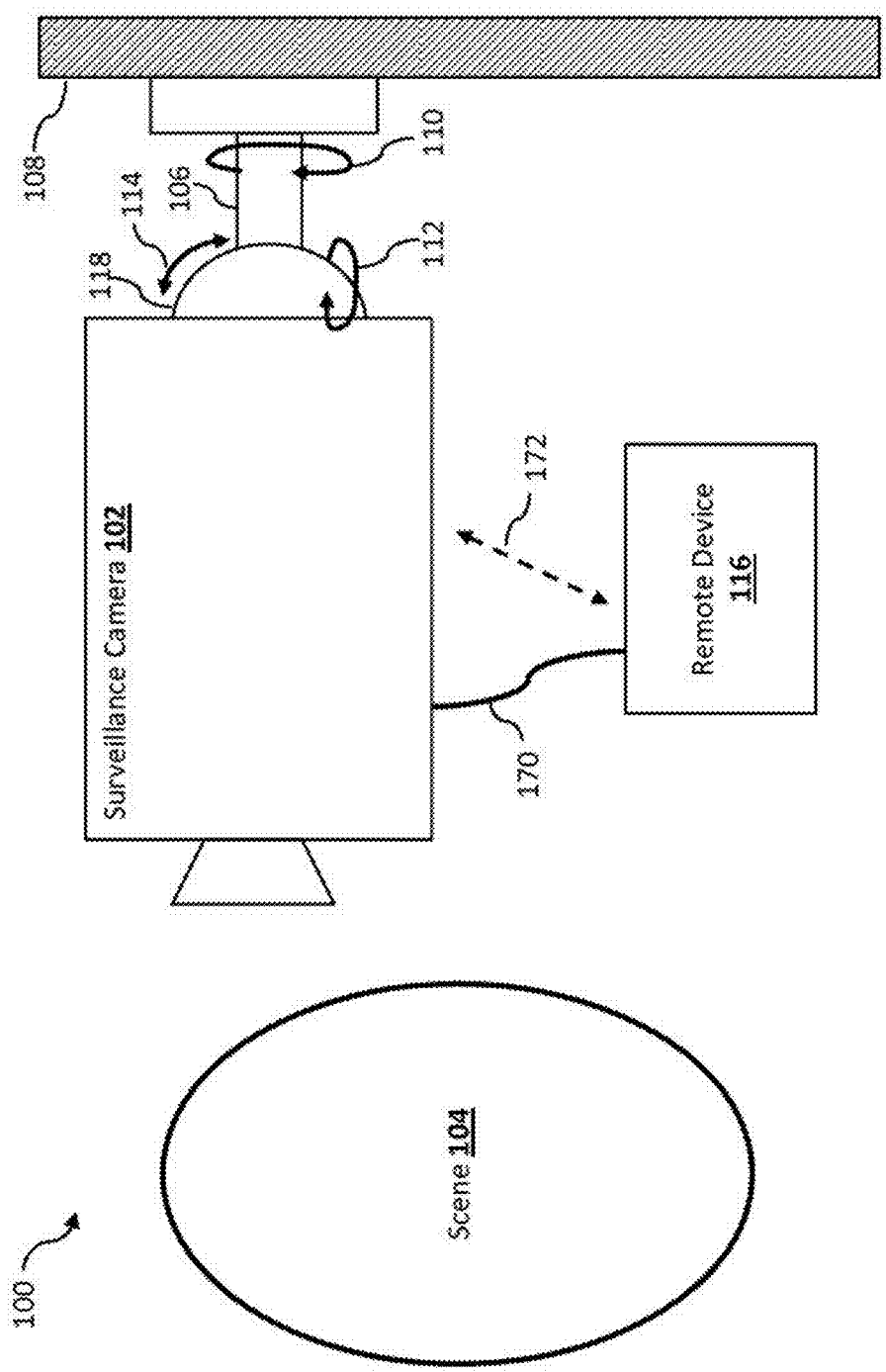
FIG. 1 illustrates an operating environment in which a surveillance camera system may operate in accordance with an embodiment of the disclosure.

Further details of such beneficial features are discussed below with reference to the figures. FIG. 1 illustrates an environment in which a surveillance camera system 100 may be operated. Surveillance camera system 100 includes surveillance camera 102 and a remote device 116. In the illustrated embodiment of FIG. 1, surveillance camera 102 and remote device 116 may communicate with each other over a wired connection 170 and/or a wireless connection 172 to perform various operations for automatic calibration and master configuration for video analytics as discussed herein. In some embodiments, remote device 116 may be omitted, with all or some of the components of remote device 116 being implemented in surveillance camera 102.

As shown, surveillance camera 102 can be securely attached to a structure 108 (e.g., a wall, ceiling, pole, or other structure appropriate for installing surveillance camera 102 for surveillance purposes) via a mount 106 to monitor and/or track objects within a scene (e.g., scene 104). Mount 106 in some embodiments may be adjustable to rotate or pivot surveillance camera 102 to adjust for roll 110, yaw 112 (e.g., for panning), and/or pitch 114 (e.g., for tilting). The adjustments provided by mount 106 in these embodiments may facilitate installation of surveillance camera 102 on a variety of mounting points (e.g., including a corner of a room) at desired pan and/or tilt angles. In one or more specific examples, adjustable mount 106 may include a rotatable joint 118 (e.g., a ball joint) that allows rotation or pivoting in directions 110, 112, and/or 114.

Figure 2:
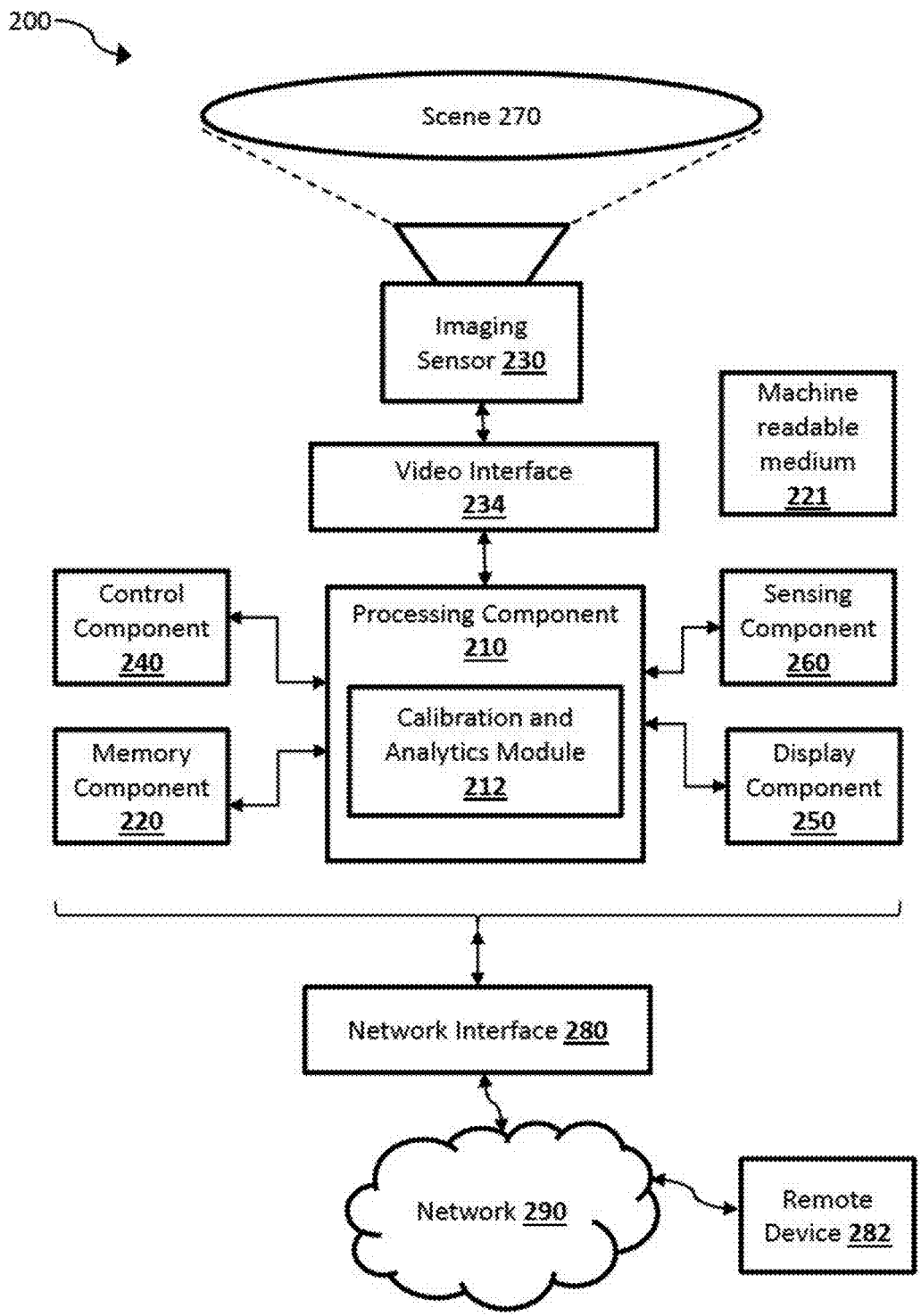
FIG. 2 illustrates a block diagram of a surveillance camera system in accordance with an embodiment of the disclosure.

Turning now to FIG. 2, a block diagram is illustrated of a surveillance camera system 200 for monitoring and analyzing a scene in accordance with an embodiment of the disclosure. System 200 comprises, according to one implementation, a processing component 210, a memory component 220, an imaging sensor 230, a video interface component 234, a control component 240, a display component 250, a sensing component 260, and a network interface 280.

System 200 may represent an imaging device, such as a video camera, to capture and process video image frames of a scene 270. In this regard, the imaging sensor 230 of system 200 may be configured to capture videos (e.g., multiple video image frames) of scene 270 in a particular spectrum or modality within a FOV associated with imaging sensor 230. The FOV associated with imaging sensor 230 may be defined by the sensor dimension (e.g., the width and height of the sensor comprising sensor elements arranged in an two-dimensional array) and optical elements that direct electromagnetic radiation (e.g., including visible light, near infrared (IR) radiation, thermal IR radiation, ultraviolet (UV) radiation) from the scene 270 to the imaging sensor 230.

In some embodiments, the imaging sensor 230 may include a visible light (VL) imaging sensor which may be implemented, for example, with a charge-coupled device (CCD) sensor, a complementary metal-oxide semiconductor (CMOS) sensor, an electron multiplying CCD (EMCCD), a scientific CMOS (sCMOS) sensor and/or other appropriate image sensor to generate image signals of visible light received from the scene. Depending on the sensor type, VL camera may be configured to capture electromagnetic radiation in other wavelengths in addition to or instead of visible light. For example, in some embodiments, the visible light camera may be configured to capture images of near IR and/or short-wave IR radiation from the scene.

Imaging sensor 230, in some embodiments, may include a thermal IR imaging sensor which may be implemented, for example, with a focal plane array (FPA) of bolometers, thermocouples, thermopiles, pyroelectric detectors, or other IR sensor elements responsive to thermal IR radiation in the mid-wave (MWIR) or long-wave (LWIR) ranges. In some embodiments, surveillance camera system 200 may include both a VL imaging sensor and a thermal IR imaging sensor.

Processing component 210 may be implemented as any appropriate circuitry or device (e.g., a processor, microcontroller, application specific integrated circuit (ASIC), field-programmable gate array (FPGA), or other programmable or configurable logic devices) that is configured (e.g., by hardware configuration, software instructions, or a combination of both) to perform various operations to provide automatic calibration and master configuration for video analytics.

It should be appreciated that calibration and analytics module 212 may, in some embodiments, be integrated in software and/or hardware as part of processing component 210, with code (e.g., software instructions and/or configuration data) for calibration and analytics module 212 stored, for example, in memory component 220. In some embodiments, a separate machine-readable medium 221 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations disclosed herein. In one aspect, machine-readable medium 221 may be portable and/or located separate from system 200, with the stored software instructions and/or data provided to system 200 by coupling the computer-readable medium to system 200 and/or by system 200 downloading (e.g., via a wired link and/or a wireless link) from computer-readable medium 221. For example, depending on specific embodiments, some or all of the operations to provide automatic calibration and master configuration for video analytics may be performed by processing component 210 and calibration and analytics module 212. Thus, in some embodiments, processing component 210 may be communicatively coupled to (e.g., configured to communicate with) imaging sensor 230 and configured to track an object in the video image frames captured by imaging sensor 230, determine a correlation between a plurality of image locations in the video image frames and corresponding image sizes of the tracked object, and perform video analytics based on the correlation between the image locations and the corresponding imaged sizes of the object.

Memory component 220 comprises, in one embodiment, one or more memory devices configured to store data and information, including video image data and information. Memory component 220 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory. As discussed above, processing component 210 may be configured to execute software instructions stored in memory component 220 so as to perform method and process steps and/or operations described herein. Processing component 210 and/or video interface 234 may be configured to store in memory component 220 video image frames or digital image data captured by the imaging sensor 230.

Image interface 234 may include, in some embodiments, appropriate input ports, connectors, switches, and/or circuitry configured to interface with external devices (e.g., a remote device 282 and/or other devices) to receive video image frames (e.g., digital image data) generated by or otherwise stored at the external devices. The received videos or image data may be provided to processing component 210. In this regard, the received videos or image data may be converted into signals or data suitable for processing by processing component 210. For example, in one embodiment, video interface 234 may be configured to receive analog video data and convert it into suitable digital data to be provided to processing component 210.

In some embodiment, video interface 234 may comprise various standard video ports, which may be connected to a video player, a video camera, or other devices capable of generating standard video signals, and may convert the received video signals into digital video/image data suitable for processing by processing component 210. In some embodiments, image interface 234 may also be configured to interface with and receive images (e.g., image data) from the imaging sensor 230. In other embodiments, the imaging sensor 230 may interface directly with processing component 210.

Control component 240 comprises, in one embodiment, a user input and/or interface device, such as a rotatable knob (e.g., potentiometer), push buttons, slide bar, keyboard, and/or other devices, that is adapted to generate a user input control signal. Processing component 210 may be configured to sense control input signals from a user via control component 240 and respond to any sensed control input signals received therefrom. Processing component 210 may be configured to interpret such a control input signal as a value, as generally understood by one skilled in the art. In one embodiment, control component 240 may comprise a control unit (e.g., a wired or wireless handheld control unit) having push buttons adapted to interface with a user and receive user input control values. In one implementation, the push buttons of the control unit may be used to control various functions of system 200, such as initiate a calibration, adjusting one or more parameters of video analytics, autofocus, menu enable and selection, field of view, brightness, contrast, noise filtering, image enhancement, and/or various other features of an imaging system or camera.

Display component 250 comprises, in one embodiment, an image display device (e.g., a liquid crystal display (LCD)) or various other types of generally known video displays or monitors. Processing component 210 may be configured to display image data and information (e.g., video analytics information) on display component 250. Processing component 210 may be configured to retrieve image data and information from memory component 220 and display any retrieved image data and information on display component 250. Display component 250 may comprise display circuitry, which may be utilized by the processing component 210 to display image data and information. Display component 250 may be adapted to receive image data and information directly from the imaging sensor 230, processing component 210, and/or video interface component 234, or the image data and information may be transferred from memory component 220 via processing component 210.

Sensing component 260 comprises, in one embodiment, one or more sensors of various types (e.g., accelerometer, orientation sensors, etc.), depending on the application or implementation requirements, as would be understood by one skilled in the art. Sensors of sensing component 260 provide data and/or information to at least processing component 210. In one aspect, processing component 210 may be configured to communicate with sensing component 260. In various implementations, sensing component 260 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited, or orientation condition (e.g., how much panning, yawing, and/or tilting) of the camera. Sensing component 160 may represent conventional sensors as generally known by one skilled in the art for monitoring various conditions (e.g., orientation information, environmental conditions, etc.) that may have an effect (e.g., on the image appearance) on the image data provided by imaging sensor 230.

In some implementations, sensing component 260 (e.g., one or more of sensors) may comprise devices that relay information to processing component 210 via wired and/or wireless communication. For example, sensing component 260 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, processing component 210 can use the information (e.g., sensing data) retrieved from sensing component 260 to modify a configuration of imaging sensor 130 (e.g., adjusting a light sensitivity level, adjusting a direction or angle of the imaging sensor 130, adjusting an aperture, etc.) or modify one or more parameters in providing analysis on the video image frames.

In various embodiments, various components of system 200 may be combined and/or implemented, as desired or depending on the application or requirements. In one example, processing component 210 may be combined with memory component 220, the imaging sensor 230, video interface component 234, display component 250, network interface 280, and/or sensing component 260 and implemented within the enclosure of surveillance camera 102. In another example, processing component 210 may be combined with the imaging sensor 230, such that certain functions of processing component 210 are performed by circuitry (e.g., a processor, a microprocessor, a logic device, a microcontroller, etc.) within the imaging sensor 230.

Furthermore, in some embodiments, various components of system 200 may be distributed and in communication with one another over a network 290. In this regard, system 200 may include network interface 280 configured to facilitate wired and/or wireless communication among various components of system 200 over network 290. For example, some of the component may be implemented in surveillance camera 102 while the other components may be implemented in remote device 116. In such embodiments, components may also be replicated if desired for particular applications of system 200. That is, components configured for same or similar operations may be distributed over a network. For example, at least some of the components in system 200 may be implemented in both surveillance camera 102 and remote device 116. Further, all or part of any one of the various components may be implemented using appropriate components of a remote device 282 (e.g., remote device 116) in communication with various components of system 200 via network interface 280 over network 290, if desired. Thus, for example, all or part of processor 210, all or part of memory component 220, and/or all of part of display component 250 may be implemented or replicated at remote device 282 (or remote device 116), and configured to perform calibration of camera and/or video analytics as further described herein. In some embodiments, system 200 may not comprise imaging sensors (e.g., imaging sensor 230), but instead receive images or image data from imaging sensors located separately and remotely from processing component 210 and/or other components of system 200. In other embodiments, all components in system 200 are implemented in surveillance camera 102, and remote device 116 is omitted from the surveillance camera system. It will be appreciated that many other combinations of distributed implementations of system 200 are possible, without departing from the scope and spirit of the disclosure.

Figure 3:
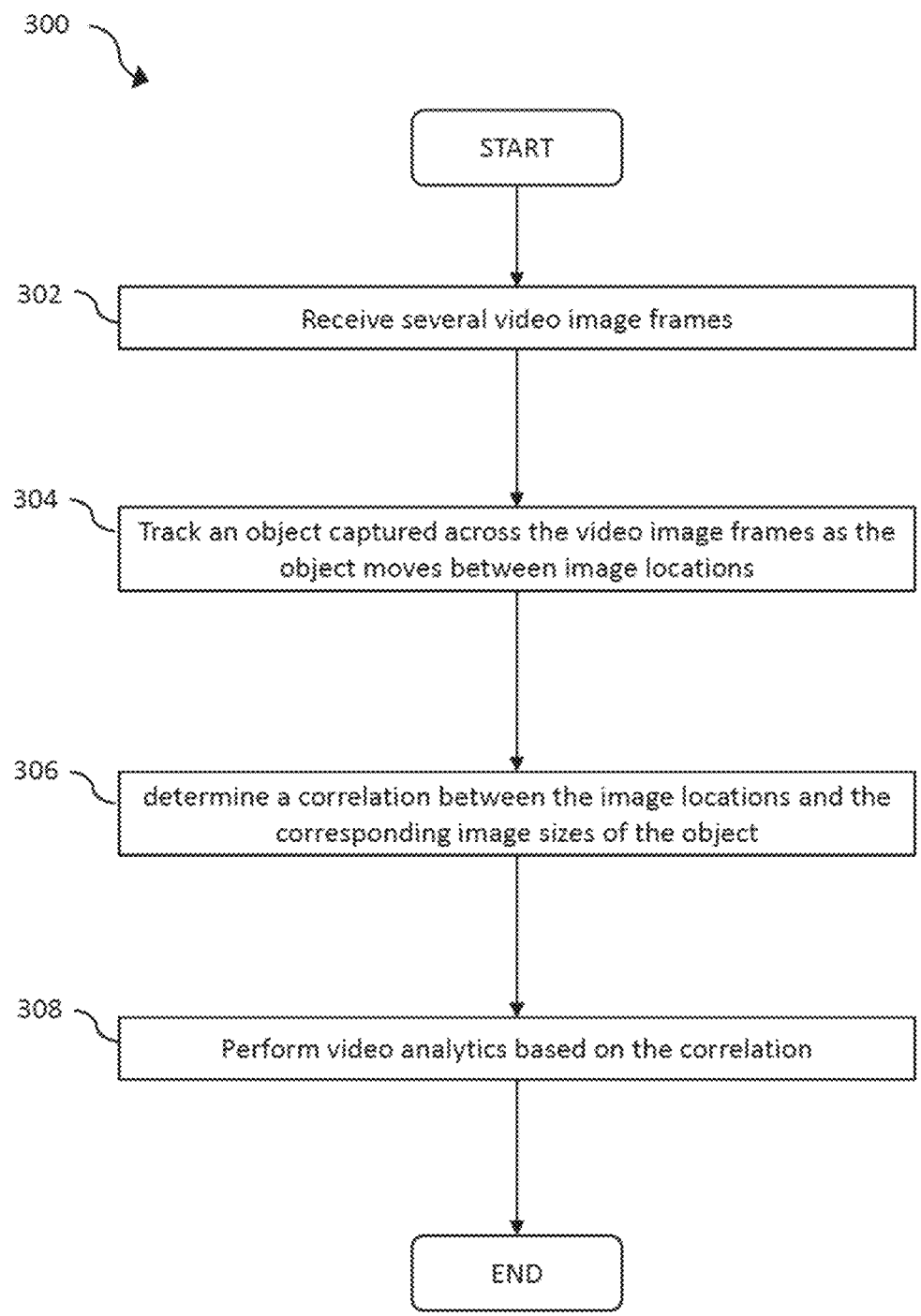
FIG. 3 illustrates a process for automatically calibrating a surveillance camera system in accordance with an embodiment of the disclosure.
Figure 4:
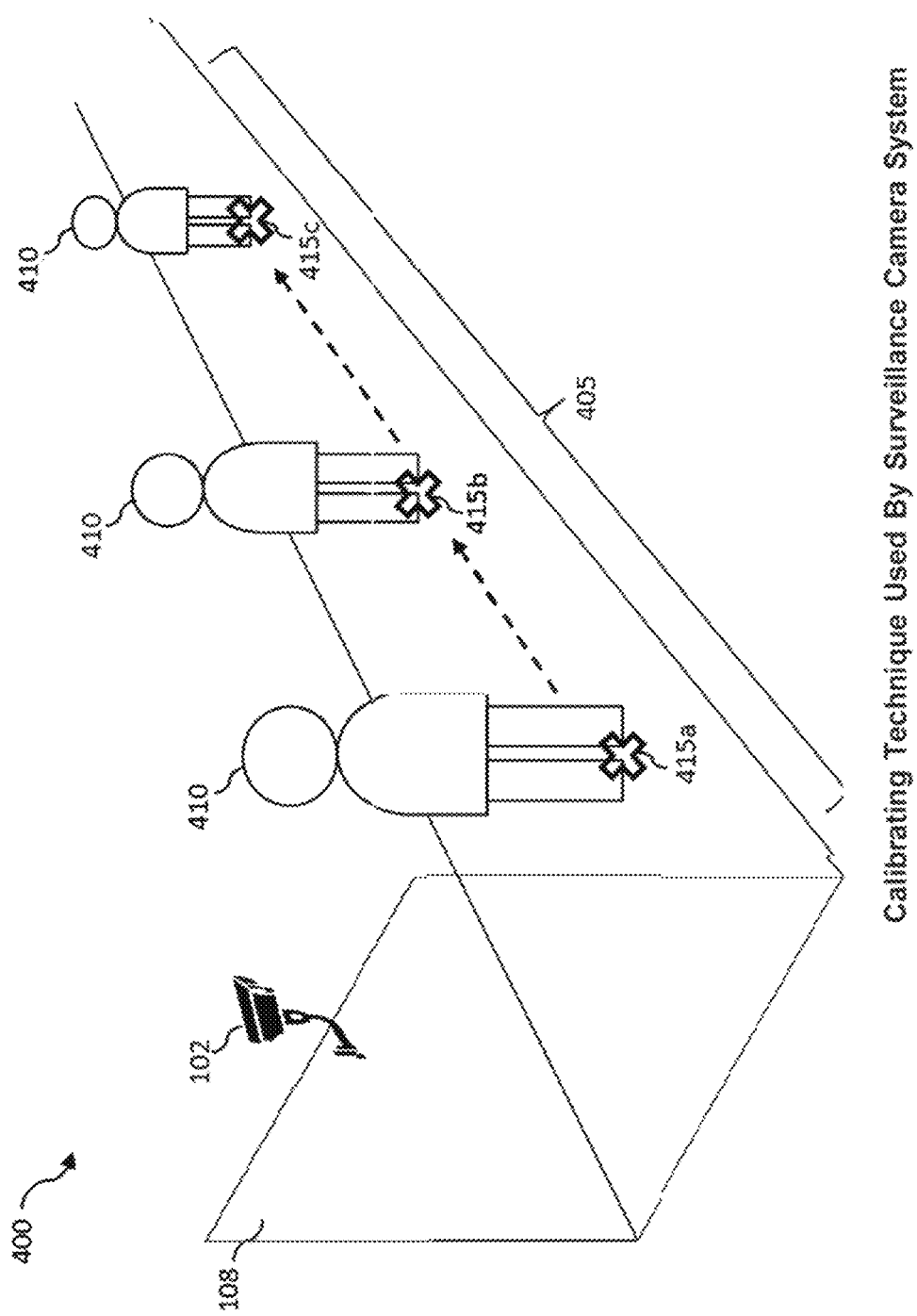
FIG. 4 illustrates a calibrating technique used by the surveillance camera system in accordance with an embodiment of the disclosure.

As discussed above, processing component 210 configured as such can provide automatic calibration for video analytics. Details of such operations to provide automatic calibration are discussed in more details below. FIG. 3 illustrates a process 300 for automatically calibrating a surveillance camera for video analytics. In some embodiments, process 300 is performed by surveillance camera system 100 or 200 when surveillance camera 102 is initially installed at a location or when surveillance camera 102 has been moved to a different location or orientation. FIG. 4 illustrates an example environment in which surveillance camera 102 may be installed. In this example, surveillance camera 102 has been mounted on a wall 108, and is configured to capture the scene of an alley 405. When the automatic calibration operation is initiated (e.g., by a user sending a calibration initiation signal to processing component 210 via control component 240, or automatically initiated by calibration and analytics module 212 upon a system start, etc.), processing component 210 is configured to instruct imaging sensor 230 to capture several video image frames of scene 405, and sends the captured video image frames to processing component 210.

As such, the process 300 begins by receiving (at step 302) several video image frames. Preferably, the video image frames capture an object (e.g., a person) moving across the image frame. As defined herein, the image frame is defined by the dimensions of the imaging sensor (e.g., imaging sensor 230). Each video image frame captured by the same sensor has the same dimension defined by the imaging sensor. Objects that are captured by the imaging sensor might appear at different location on the image frame, depending on the orientation/position of the camera, the optical element, and the position of the object relative to the camera. As an object moves between different positions relative to the camera, the object appears in different locations on the image frame. In the example illustrated in FIG. 4, a person 410 moves from location 415*a* to location 415*b*, and then to location 415*c* in alley 405 while being captured by surveillance camera 102.

Figure 5:
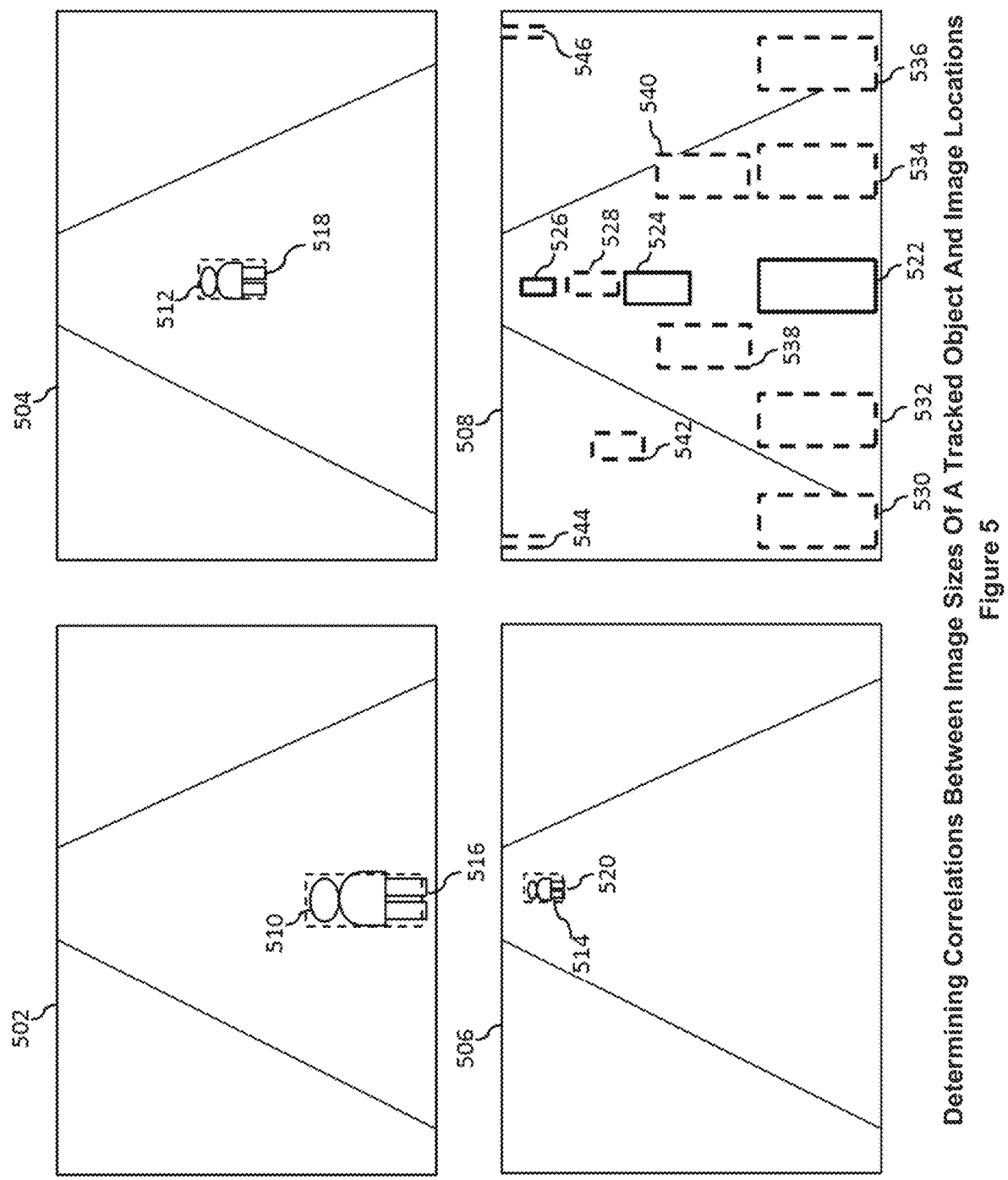
FIG. 5 illustrates determining correlations between image sizes of a tracked object and image locations that may be performed by a surveillance camera system in accordance with an embodiment of the disclosure.

FIG. 5 illustrates video image frames 502, 504, and 506 that imaging sensor 230 captured of scene 405 during the movement of person 410. Specifically, video image frame 502 represents scene 405 when person 410 is at location 415*a*, video image frame 504 represents scene 405 when person 410 is at location 415*b*, and video image frame 506 represents scene 405 when person 410 is at location 415*c*. As shown, the movement of person 410 in scene 405 causes the image of the person to move from image location 516 in video image frame 502 to image location 518 in video image frame 504, and then to image location 520 in video image frame 506. In addition, due to the perspective of surveillance camera 102, the image size of the image of the person changes as person 410 moves in scene 405. As shown, image of the person 510 in video image frame 502 appears to be larger than image of the person 512 in video image frame 504, and image of the person 512 in video image frame 504 appears yet to be larger than image of the person 514 in video image frame 506. As can be understood from FIGS. 4 and 5, due to the distance and perspective from surveillance camera 102 to person 410, the size of the image of person 410 in video image frames 502, 504, and 506 changes depending on person 410's locations 415*a*-415*c* in scene 405 and corresponding image locations 516-520 in video image frames 502, 504, and 506. Thus, to perform video analytics more accurately, the varying image size of person 410 in video image frames 502, 504, and 506 should be known and accounted for.

Specifically, the various image sizes of images of person 410 and their corresponding image locations within the image frame may enable calibration and analytics module 212 to perform various analysis (e.g., object recognition, object tracking, etc.) on surveillance videos. As such, after receiving the video image frames, process 300 tracks (at step 304) an object captured across the video image frames as the image of the object moves between locations in the image frame and determines (at step 306) a correlation between the image location and the corresponding image sizes of the object.

In this regard, surveillance camera system 100 or 200 according to an embodiment is configured to detect and track person 410 moving about in scene 405 and determines a correlation between various image locations (e.g., including image locations 516-520) in video image frames 502, 504, and 506, and corresponding image sizes of the tracked object (e.g., tracked person 410). The determination of the correlation may in some embodiments include storing the association between the tracked image locations 516-520 and the corresponding imaged sizes of the object (e.g., image sizes of images 510, 512, and 514) as they appear in video image frames 502, 504, and 506. The determination of the correlation may in some embodiments include interpolating and/or extrapolating, for example using a regression algorithm, the stored association between the tracked image locations and the corresponding imaged sizes to obtain estimated imaged size for image locations that have not been tracked. In this way, the imaged size need not be recorded for every possible image location, but rather the imaged size can be estimated with sufficient accuracy from a predetermined number of tracked image locations.

FIG. 5 illustrates an image frame 508 that displays various recorded and learned correlations between image sizes of person 410 and corresponding image locations. After analyzing video image frames 502, 504, and 506, surveillance camera system 100 or 200 may be configured to store the image sizes of person 410 and their corresponding image locations on image frame 508. As shown, the recorded image sizes and corresponding image locations are represented on image frame 508 as solid rectangular boxes, such as image size 522 that corresponds to image location 516, image size 524 that corresponds to image location 518, and image size 526 that corresponds to image location 520. In addition, using a regression algorithm, surveillance system 100 or 200 may be configured to extrapolate/interpolate additional image sizes at other image location on image frames 508. For example, processing component 210 may be configured to estimate image size of person 410 at image location 528 (displayed as broken rectangular box) based on the rate of change of image sizes 522, 524, and 526 (e.g., how fast the image sizes change/shrink) and the position of image location 528 relative to image locations 516, 518, and 520. Since image location 528 is between image locations 518 and 520, the estimated size at image location 528 by surveillance system 100 or 200 is larger than image size 526 but smaller than image size 524.

In some embodiments, estimated image sizes may be determined to be similar for image locations that differ in their horizontal locations of the scene (different locations across the image frame that is parallel to the horizon of the scene) but have same or adjacent vertical locations of the scene (different location in a direction that is perpendicular to the horizon of the scene). When surveillance camera 102 is installed in an upright orientation, such that the horizontal dimension of image sensor 230 is parallel to the horizon of scene 405 (as in the case in the example illustrated here), the horizontal dimension (e.g., x-axis or width) of the video image frames is parallel to the horizon of the scene, and the vertical dimension (e.g., y-axis or height) of the video image frames is perpendicular to the horizon of the scene. However, it is contemplated that surveillance camera 102 may not be installed in an upright orientation. As such, surveillance system 100 or 200 may be configured to define a horizon within the image frame based on sensor data retrieved from sensing component 260. For example, processing component 210 may be configured to retrieve orientation sensor data from sensing component 260 and determine a line or horizon on image frame based on the orientation sensor data.

In the example illustrated here, since surveillance camera 102 was installed in an upright position (as detected by processing component 210), calibration and analytics module 212 is configured to determine that the horizon of scene 405 is parallel to the width of the image frame. As such, calibration and analytics module 212 is configured to estimate that image sizes of person 410 at various horizontal image locations should be the same. For example, calibration and analytics module 212 may be configured to estimate that image sizes at image locations 530, 532, 534, and 536 to be the same as image size 522 (indicated as dotted rectangular boxes). Furthermore, calibration and analytics module 212 may be configured to estimate image sizes at other locations (e.g., image locations 538, 540, 542, 544, and 546) using the techniques described above.

The image sizes that are determined and shown in image frame 508 of FIG. 5 represent various image sizes for person 410 as person 410 is captured by surveillance camera 102. Calibration and analytics module 212 may be configured to use the determined and extrapolated correlations between image sizes and image locations to detect and/or track person 410 as person 410 moves into scene 405 subsequently (after calibration is complete). It is contemplated that the user might desire to use the surveillance system 100 or 200 to identify and/or track other objects of interest as well that might have different sizes and/or dimensions than person 410. As such, in addition to recording various image sizes at different locations on the image frame for person 410, calibration and analytics module 212 may be configured to derive associations between changes of image sizes and changes of image locations on the image frame, such that the information can be used for identifying and/or tracking objects of different sizes.

Figure 6:
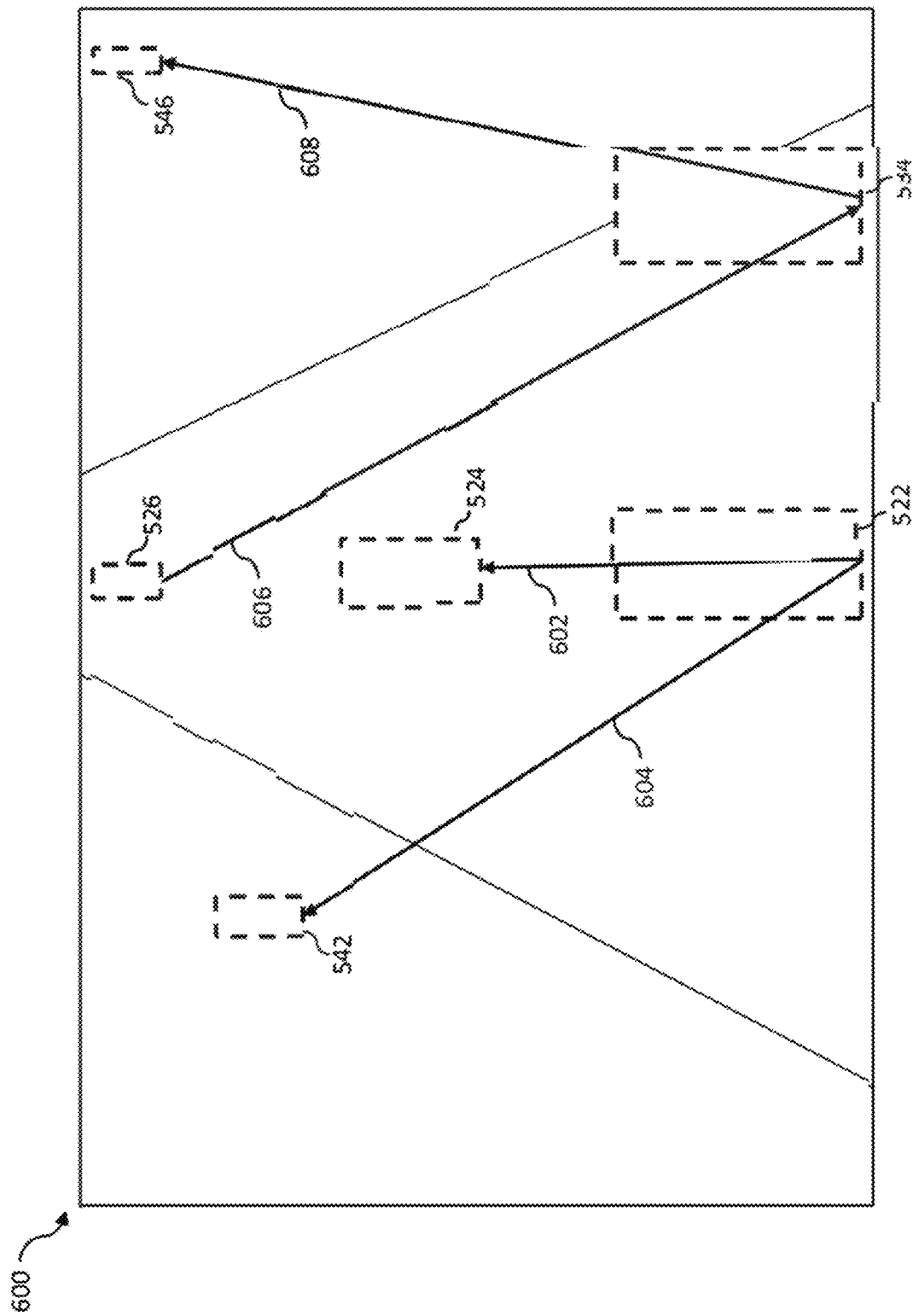
FIG. 6 illustrates determining changes of image size for various changes of image location that may be performed by a surveillance camera system in accordance with an embodiment of the disclosure.

FIG. 6 illustrates an image frame 600 with various image sizes of person 410 that are either recorded or extrapolated/interpolated at various image locations on image frame 600. For example, dotted rectangular boxes that represent different image sizes are shown at image locations 522, 524, 526, 534, 542, and 546. As mentioned above, calibration and analytics module 212 may be configured to derive changes of image sizes for different changes of image locations on the image frame. In this example, calibration and analytics module 212 may be configured to derive a change of image sizes of 2:1 (both length and width) (in other words, reducing the size by half) for the change of image location from image location 522 to image location 524 based on a computed difference between the recorded image sizes of person 410 for locations 522 and 524. Thus, the image size of any object should be reduced by half when the object moves from image location 522 to image location 524 on the image frame. Accordingly, calibration and analytics module 212 may be configured to associate the change of image sizes of 2:1 with the change of image location from image location 522 to image location 524 (represented by arrow 602). Similarly, calibration and analytics module 212 may be configured to derive a change of image sizes of 1:2 (in other words, doubling the size on both length and width) for a change of image location from image location 524 to image location 522.

By computing an image size difference between the image size of person 410 at image location 522 and the image size of person 410 at image location 542, calibration and analytics module 212 may be configured to derive a change of image size of 4:1 (in other words, reducing the size by three fourth) for a change of image location from image location 522 to image location 542 (represented by arrow 604). In the same manner, a change of image size of 1:5 (in other words, enlarging by five times the original image size) may be associated with a change of image location from image location 526 to image location 534 (represented by arrow 606), and an a change of image size of 5:1 may be associated with a change of image location from image location 534 to image location 546 (represented by arrow 608). Additional size changes may be derived for various image location changes on the image frames using the same technique described herein.

In addition to, or instead of, deriving image size changes for various image location changes on the image frame, calibration and analytics module 212 of some embodiments may also be configured to generate a correlation between the actual physical size of a tracked object and an image size at one or more of the image locations. The actual physical size of the tracked object may be obtained in different ways. For example, if the tracked object (e.g., person 410) is the user of the surveillance system 100 or 200, the user may manually input his/her dimensions via control component 240. Alternatively, calibration and analytics module 212 may be configured to use one of the object recognition techniques (e.g., scale invariant features transform (SIFT), etc.) to recognize an object within a video image frame that has known size and dimensions (e.g., a mailbox, a car of a specific model, a landmark, etc.). The calibration and analytics module 212 may then be configured to retrieve the known size and dimensions of the recognized object from an internal database or an external database over a network (e.g., from the Internet, etc.). With the recorded correlations between image sizes and various image locations on the image frame, and the correlation between image sizes of images of the object on the image frame and the actual physical size of the object, calibration and analytics module 212 is enabled to detect and/or track objects of any size.

It is appreciated that the calibration techniques disclosed herein advantageously perform calibration of surveillance camera systems with minimal input, or even no input, from a user. The input required from the user is also very simple such that it is not required that the user has any knowledge or skills in surveillance camera calibration. In one example, the user may simply install the surveillance camera at a desired location and turn it on, and the surveillance camera is configured to automatically perform the calibration process as described above entirely or largely without any user input, interaction, or interference. Specifically, the surveillance camera system is configured to detect any moving object, track the object across multiple video image frames, and determine correlations between image sizes of the object and the image locations using the techniques described herein without user input, interaction, or interference.

It is noted that camera surveillance system 100/200 may require calibration again after surveillance camera 102 is moved in any way (e.g., moved to a new location, changed orientation by one or more of roll, yaw, and pitch movement, etc.). As such, calibration and analytics module 212 of some embodiments is configured to detect any of such movement by periodically monitor sensor data from sensing component 260. After a movement is detected, calibration and analytics module 212 may be configured to automatically perform the calibration operation as described above again, to re-calibrate surveillance camera system 100/200. In some embodiments, calibration and analytics module 212 is configured to instruct, via display component 250, a user to move around a scene in front of surveillance camera 102 for the calibration. In other embodiments, calibration and analytics module 212 is configured to automatically detect any moving objects at the scene and perform the calibration operation based on the detected moving objects without any user input, interaction, or interference.

Figure 7:
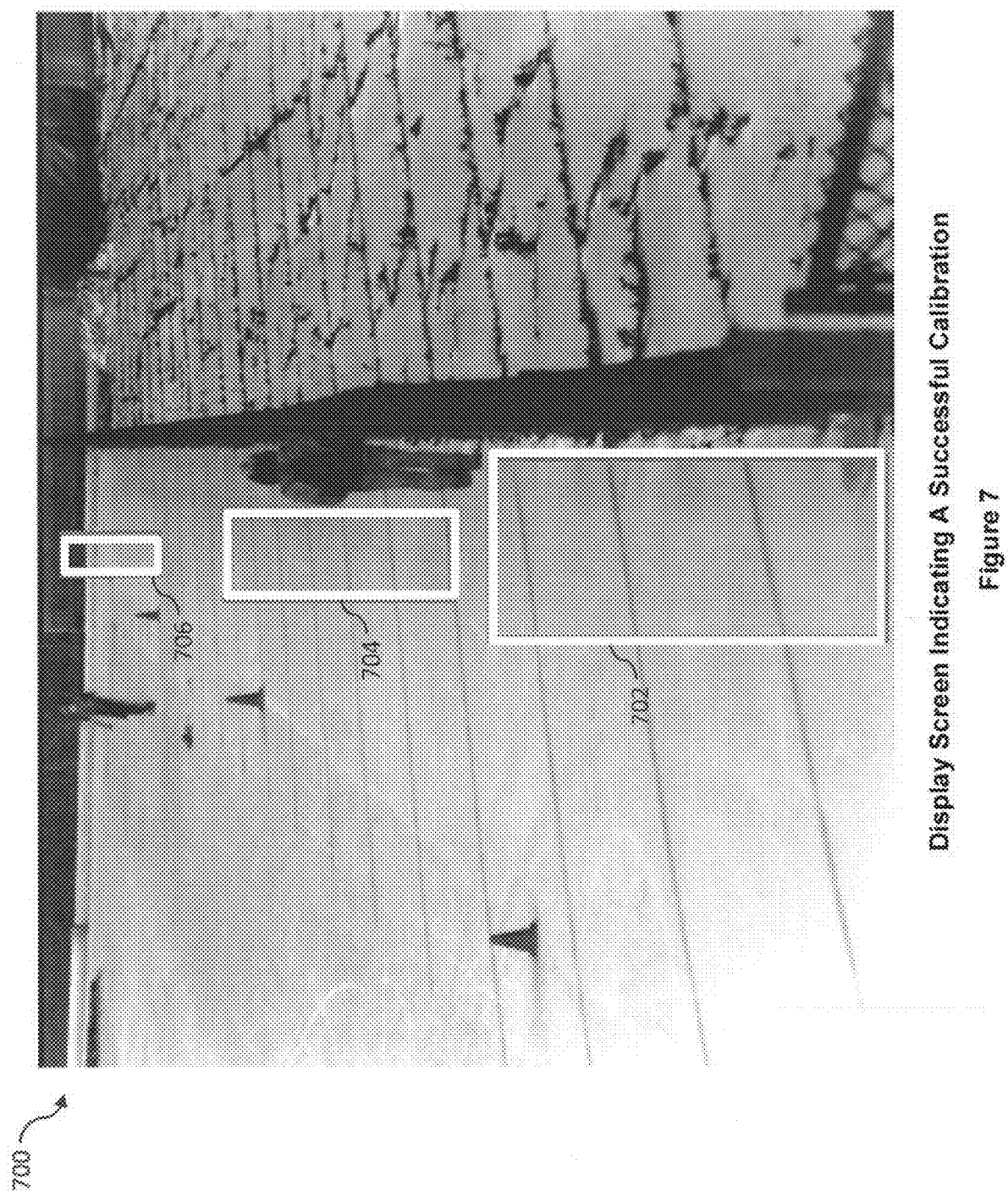
FIG. 7 illustrates a display screen indicating a successful calibration that may be rendered by a surveillance camera system in accordance with an embodiment of the disclosure.

Calibration and analytics module 212 of some embodiments may require at a minimum of two video image frames where the tracked object is located in two different image locations in order to successfully perform the calibration. In some embodiments, once calibration and analytics module 212 has successfully performed the calibration, calibration and analytics module 212 is configured to provide an indication to the user via display component 250. In some of these embodiments, the indication may include displaying representations of various image sizes that are either recorded or extrapolated of a tracked object at the corresponding image locations on an image frame to the user. FIG. 7 illustrates such an image frame 700 showing an indication that the surveillance system has been successfully calibrated. As shown, image frame 700 includes rectangular boxes 702, 704, and 706 that represent the learned image sizes of a tracked object (e.g., person 410) at the various corresponding image locations on image frame 700 through operations discussed above, in accordance with an embodiment of the disclosure. For example, processing component 210 may be configured to transmit and display output video image frame 700 with indicators 702-706 on display component 250 upon completion of the determination of the correlation between a plurality of image locations in the video image frames and corresponding image sizes, so that a user can confirm that proper calibration has been performed. Further in this regard, processing component 210 may be configured to initiate the tracking of the object and the determination of the correlation in response to receiving user input to trigger auto calibration (e.g., in response to a user pressing a button on control component 240, etc.), so that the user can move about in the scene or ask another person to move about or drive about in the scene after triggering the auto calibration for calibration and analytics module 212 to determination of the correlation between a plurality of image locations in the video image frames and corresponding image sizes.

It has been contemplated that calibration and analytics module 212 of some embodiments may be configured to continue to calibrate/update the calibration of the surveillance system 100/200 by continuously tracking new objects in the video image frames so that the calibration can be better tuned. However, once calibration and analytics module 212 has successfully completed the calibration operations, with the indications as shown above by reference to FIG. 7, calibration and analytics module 212 is configured to begin performing video analytics based on the correlations it has previously determined. As such, after determining the correlation, process 300 performs (at step 308) video analytics on subsequent video image frames based on the determined correlations.

Figure 8:
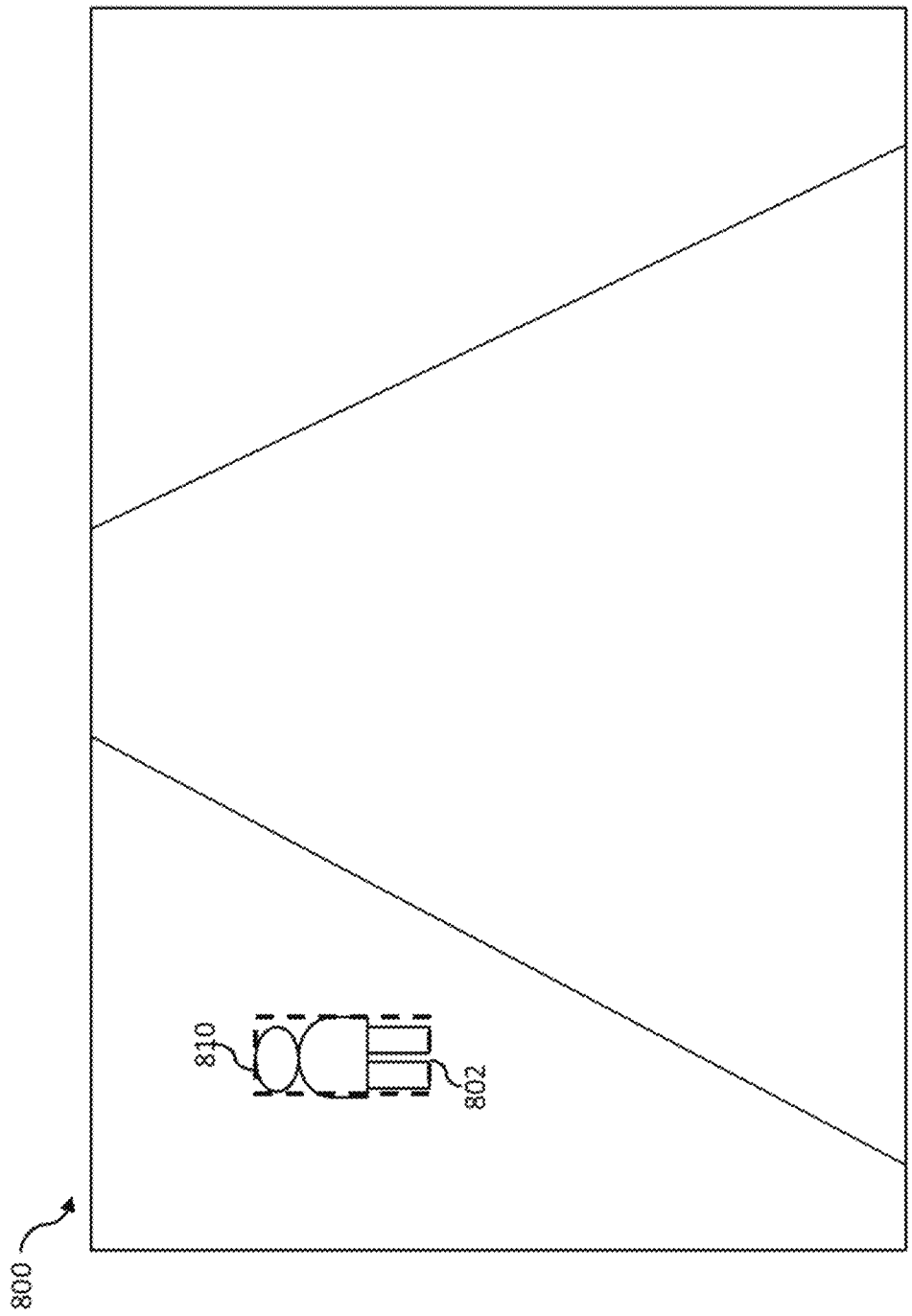
FIG. 8 illustrates an example video analysis that may be performed by a surveillance camera system in accordance with an embodiment of the disclosure.

Calibration and analytics module 212 is configured to perform various types of video analytics based on the determined correlations, in accordance with one embodiment of the disclosure. The video analytics may include detecting/identifying a person within a video image frame based on the correlations. FIG. 8 shows a video image frame 800 that surveillance system 100/200 captured. Video image frame 800 includes an image of a person 810 appeared at image location 802 of the image frame. In some embodiments, calibration and analytics module 212 is configured to identify a tracked object on a video image frame based on the image size and image location of the image of the object on the image frame. As such, an image size of the image of person 810 may be obtained (indicated by the dotted rectangular box shown in FIG. 8). The image size of person 810 may be compared with the image sizes of any known objects (e.g., person 410) at image location 802 that are previously stored in memory component 220. For example, the image size of person 410 at location 802 may be recorded or extrapolated/interpolated during the calibration operation. If calibration and analytics module 212 determines that the image size of person 810 is substantially similar (e.g., more than 90%, more than 95%, etc.) to the image size of person 410 at the same image location (image location 802), calibration and analytics module 212 may be configured to indicate that a high likelihood of person 410 appears in scene 405 to the user via display component 250.

If during the calibration operation, calibration and analytics module 212 has derived correlations between image sizes at various image locations and the actual sizes of objects, calibration and analytics module 212 may be configured to provide the actual size of the object being tracked in video image frame 800 to the user via display component 250 based on information derived from video image frame 800. For example, calibration and analytics module 212 may indicate that a person who is approximately 6 feet tall appears in scene 405 based on information derived from video image frame 800.

Figure 9:
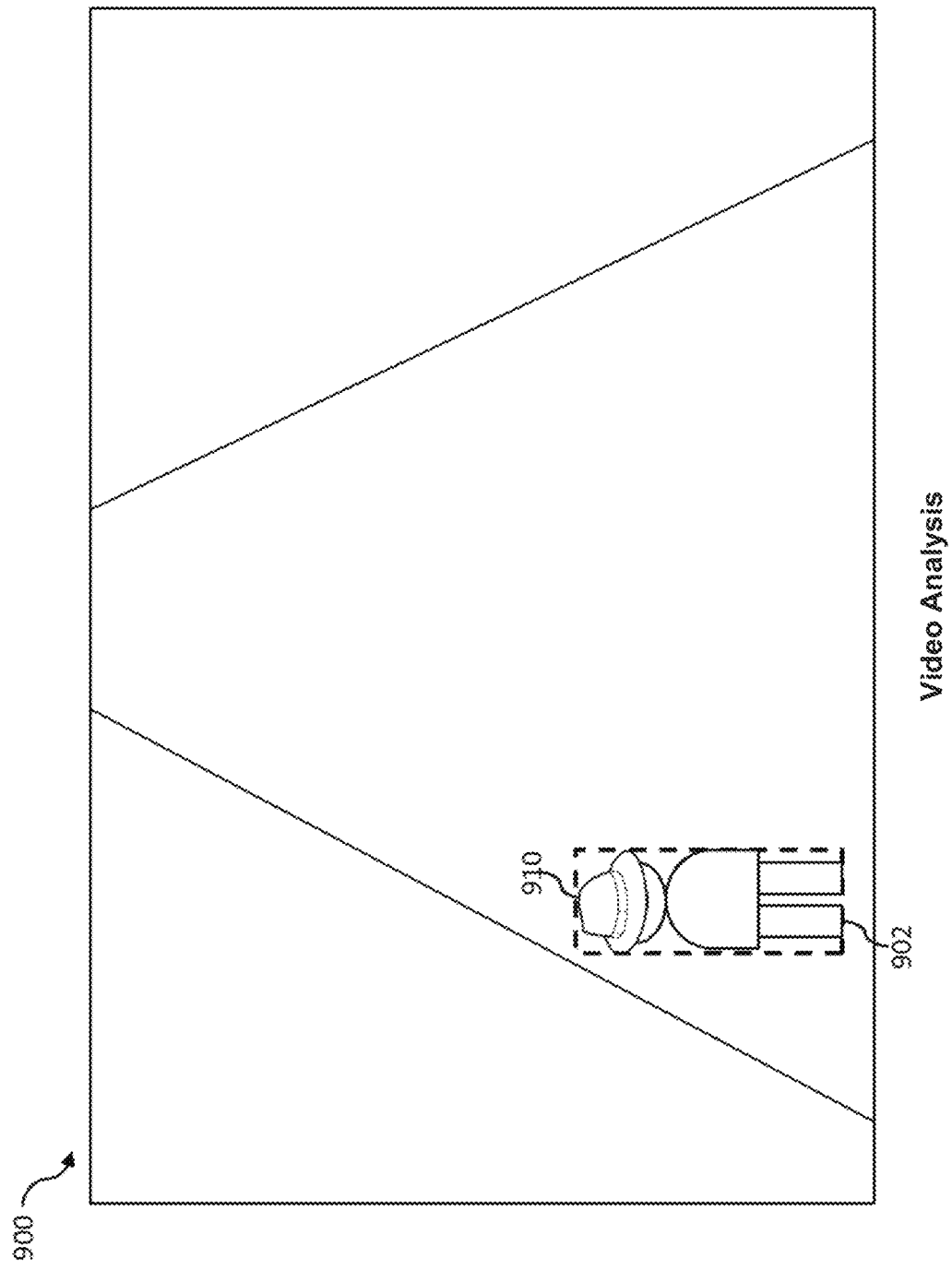
FIG. 9 illustrates another example video analysis that may be performed by a surveillance camera system in accordance with an embodiment of the disclosure.

In another example, calibration and analytics module 212 may be configured to enable the user to select an object of interest that appears in a video image frame, and based on the selection, begin to track the object of interest, even if the object goes in and out of the image frame. FIG. 9 illustrates a video image frame 900 that shows a person 910 appearing at image location 902 of frame 900. The user may select the image of person 910 as the object of interest, via control component 240 (e.g., by selecting the display area that displays the image of person 910 on a touch screen, etc.). Based on the selection, calibration and analytics module 212 may be configured to track a movement of person 910 within the scene 405. Person 910 may moves out of the scene 405 (thus, out of image frame 900) and subsequently moves back into the scene 405 (thus, back into image frame 900). When a person who looks like person 910 (based on an object recognition technique) moves back into image frame after leaving the image frame, calibration and analytics module 212 has to determine whether the person who re-appearing in the image frame is the same person identified by the user previously.

Figure 10:
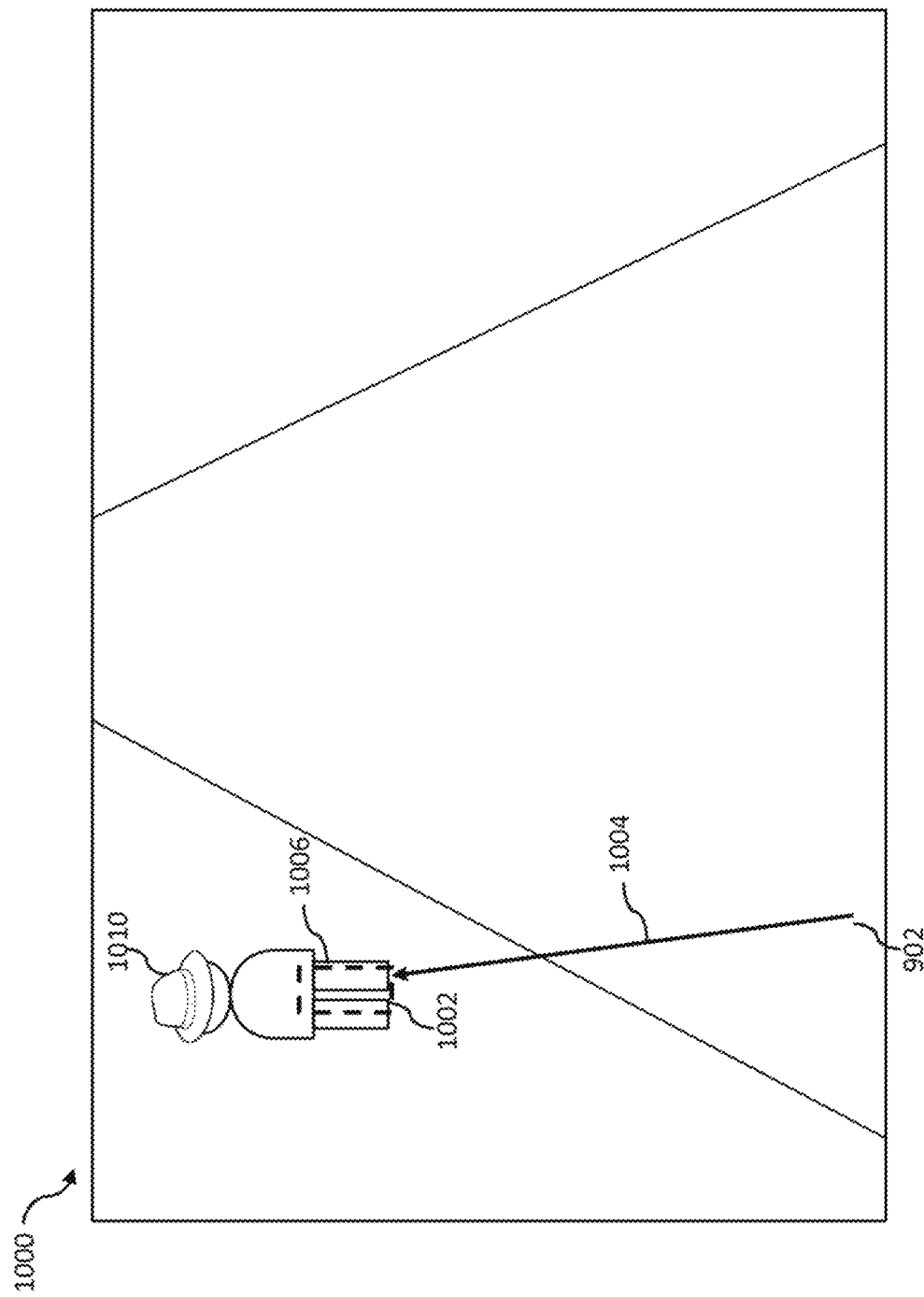
FIG. 10 illustrates an indication of an estimated image size for a tracked object that may be rendered by a surveillance camera system in accordance with an embodiment of the disclosure.

FIG. 10 illustrates video image frame 1000 that was captured after person 910 has moved out of scene 405 (and thus, out of the image frame). Video image frame 1000 includes an image of a person 1010 appearing at image location 1002 of the image frame. As shown, the image of person 1010 appears at a different image location than the image location of the image of person 910 in video image frame 900. As such, in order for calibration and analytics module 212 to determine whether there is a high likelihood that person 1010 is identical to person 910, calibration and analytics module 212 has to determine whether the image size of the image of person 1010 in video image frame 1000 correlates with the image size of the image of person 910 in video image frame 900. Using the image sizes and image locations correlation determined during the calibration operation as discussed above, calibration and analytics module 212 may be configured to determine an estimated image size of person 910 for image location 1002 based on the image sizes of person 910 that were recorded in the previous video image frames (e.g., video image frame 900). In some embodiments, calibration and analytics module 212 may be configured to retrieve a recorded change of image size for the change of image location from image location 902 to image location 1002 (represented by arrow 1004), and estimated the image size of the image of person 910 for image location 1002 as a function of the image size of the image of person 910 at image location 902 and the recorded change of image size. For example, if the recorded change of image size for the change of image location 1004 is 4:1, then the image size of the image of person 910 at image location 1002 is estimated to be one quarter of the image size of person 910 at image location 902. In this example, calibration and analytics module 212 is configured to display a dotted rectangular box 1006 to represent the estimated size of the image of person 910 at image location 1002. As shown, the image size of the image of person 1010 is substantially larger than the estimated size 1006, and as such, calibration and analytics module 212 may be configured to determine that person 1010 is not the same as person 910, and indicate as such via display component 250.

Based on the techniques disclosed herein, the calibration and analytics module 212 may advantageously detects/recognizes various objects that appear within a scene by determining the actual sizes of the objects based on the image sizes of the objects on the image frame. For example, depending on the image location in which the image of an object appears in the image frame, calibration and analytics module 212 is configured to determine and then output to the user (e.g., via display component 250) the estimated actual size of the object. In some embodiments, based on the estimated actual size of the object (e.g., a person), calibration and analytics module 212 is configured to estimate and then output to the user (e.g., via display component 250) an estimated weight of the object. In other embodiments, based on the estimated actual size of the object and information about various objects of the same type (e.g., dimensions, shapes, etc.), calibration and analytics module 212 is configured to detect an identity of the object such as a type of vehicle (e.g., a truck, a sedan, a van, etc.). Given sufficient information and details of various known objects, calibration and analytics module 212 may be configured to even determine the identity of the object in fine details (e.g., the year, make, and model of a car, etc.).

Figure 11:
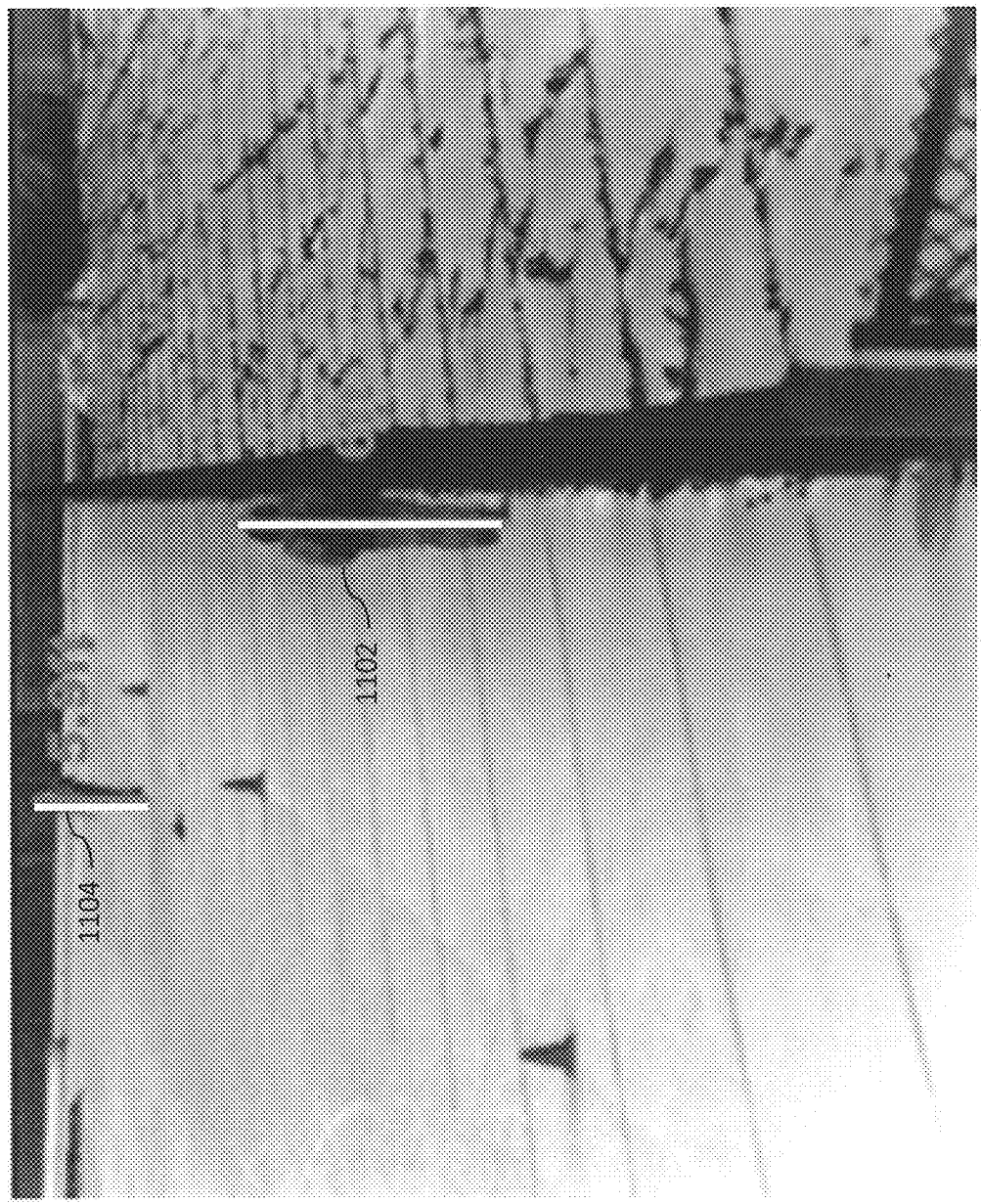
FIG. 11 illustrates an alternative surveillance camera system calibration technique in accordance with an embodiment of the disclosure.

Alternative ways of calibrating surveillance camera system 100/200 for video analytics are also discussed with reference to FIGS. 11, 12, and 13. FIG. 11 illustrates how surveillance camera 102 may be calibrated for video analytics based on user inputs (via control component 240) describing the height of at least two objects (e.g., persons 1102 and 1104) in the scene. In this example, the user specifies that the height of person 1102 is six feet and the height of person 1104 is 5.9 feet. As discussed above, the user input enables calibration and analytics module 212 of some embodiments to determine a correlation between real object size and image sizes of the object at various image locations on the image frame.

Figure 12:
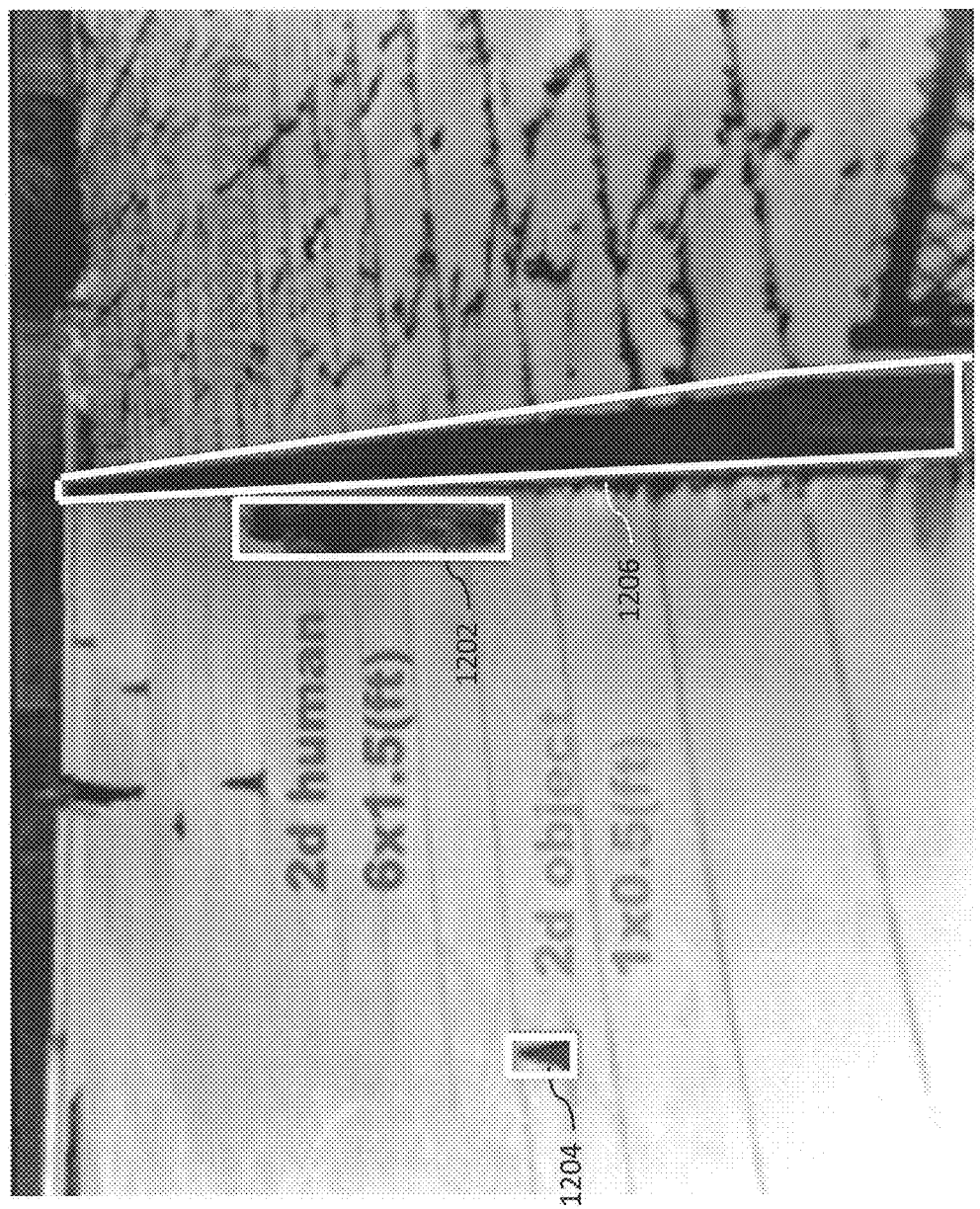
FIG. 12 illustrates another alternative surveillance camera system calibration technique in accordance with an embodiment of the disclosure.
Figure 13:
FIG. 13 illustrates yet an alternative surveillance camera system calibration technique in accordance with an embodiment of the disclosure.

FIG. 12 illustrates how surveillance camera system 100/200 may be calibrated for video analytics based on user inputs describing the locations of multiple object types (e.g., a person 1202, a test cone 1204, and a fence 1206) with known dimensions placed in the scene. For example, the user may specify that person 1202 has a size of 6 feet by 1.5 feet, cone 1204 has a size of 1 foot by 0.5 feet, and fence 1206 has a size of 30 feet by 4 feet by 0.2 feet. FIG. 13 illustrates how surveillance camera system 100/200 may be calibrated for video analytics based on user inputs describing the location of the horizon 1302 (e.g., by dragging a cursor across line 1302 that represents the horizon) and the installation height of surveillance camera 102. However, in contrast to the technique described above with FIGS. 3 through 6, the calibration techniques discussed with reference to FIGS. 11, 12, and 13 require user input and in some cases user interaction with the scene (e.g., to place objects).

Figure 14:
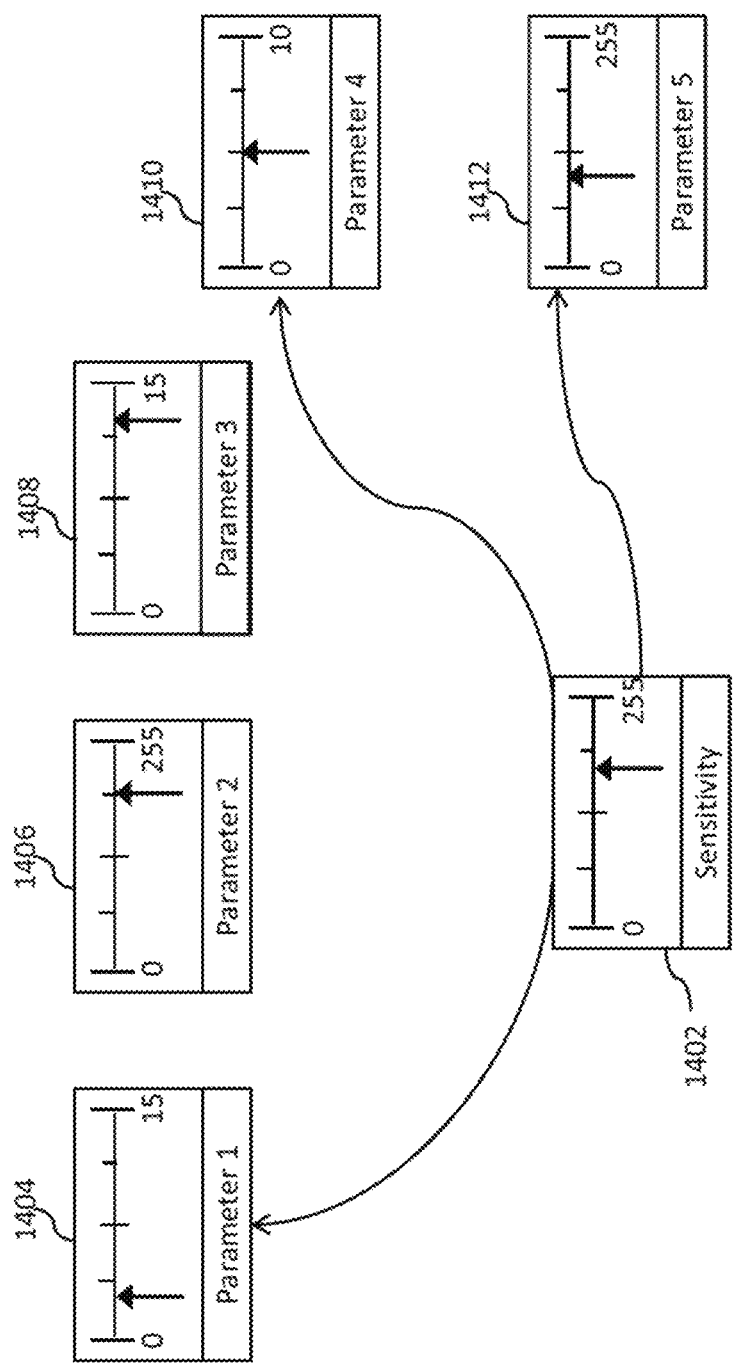
FIG. 14 illustrates using a master parameter control tool to adjust multiple video analytics parameters in accordance with an embodiment of the disclosure.

In some embodiments, calibration and analytics module 212 may be configured to receive a user input for a master parameter for the video analytics, and adjust one or more video analytics parameters in response to the master parameter input. In this way, for example, a user can configure video analytics operations through a single adjustment of the master parameter, since various video analytics parameters can be automatically adjusted based on the master parameter or given default values. FIG. 14 illustrates how one or more video analytics parameters 1404-1412 may automatically be adjusted in response to a user input to change a master parameter 1402 (also labeled "sensitivity" parameter in this example), in accordance with an embodiment. As shown, one or more of video analytics parameters (parameters 1404, 1410, and 1412 in this example) may be associated with master parameter 1402, and adjusted automatically by calibration and analytics module 212 in response to a user's input to configure master parameter 1402, while other parameters (parameters 1406 and 1408 in this example) are set to predetermined default values (e.g., which do not impact the video analytics performance too much and/or which are set at factory after field tests). The other parameters 1404-1412 may include at least some of the following parameters for video analytics: tolerances, hysteresis parameters, and thresholds associated with object sizes, detection distances, detection conditions, object segmentation, and other aspects of video analytics operations.

In some embodiments, master parameter 1402 may control only one (or a few) of the parameters while other parameters are set to predetermine default values. It should be appreciated that although various parameters 1402-1412 are graphically illustrated in FIG. 14 for ease of understanding, parameters 1402-1412 need not be presented in a graphical format or otherwise limited by how they are presented in FIG. 14.

Therefore, surveillance camera system 100 and related methods as disclosed herein may beneficially facilitate calibration and parameter configuration for video analytics, such that a surveillance camera can be installed and set up for video analytics with minimal input from a user without technical training or knowledge.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Where applicable, the ordering of various steps described herein can be changed, combined into composite steps, and/or separated into sub-steps to provide features described herein.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A surveillance camera system, comprising:
   an imaging sensor configured to generate a plurality of video image frames of a scene; and
   a logic device communicatively coupled to the imaging sensor and configured to:
      receive a user input indicating a location of a horizon;
      perform a calibration to:
         track an object captured across a first plurality of image locations in the plurality of video image frames;
         determine an association between the first plurality of image locations and corresponding image sizes of the tracked object;
         extrapolate and/or interpolate the association to obtain image sizes of the tracked object at a second plurality of image locations different from the first plurality of image locations, wherein the image sizes of the tracked object at the second plurality of image locations are further based on the horizon, wherein extrapolating and/or interpolating comprises determining a plurality of additional associations between changes of image sizes and changes of image locations based on the association, and wherein the determining the plurality of additional associations comprises associating no change of image size with a change of image locations parallel to the horizon of the scene;
         determine a correlation between the first and second pluralities of image locations and the corresponding image sizes of the tracked object in the plurality of video image frames;
         determine a physical size of the tracked object;
         determine a second correlation between the image sizes and the physical size; and
      perform video analytics based on the second correlation and the correlation between the image locations and the corresponding image sizes of the object determined by the calibration, wherein performing the video analytics comprises displaying, on an image frame, representations of the association between the first plurality of image locations and corresponding image sizes of the tracked object and/or representations associated with the image sizes of the tracked object at the second plurality of image locations.

2. The surveillance camera system of claim 1, wherein:
tracking the object comprises:
   tracking a movement of the object from a first image location in a first video image frame to a second image location in a second video image frame;
the logic device is configured to perform the calibration further to:
   determine a first image size of the tracked object in the first video image frame and a second image size of the tracked object in the second video image frame; and
the association is at least between (i) a change of image size from the first image size to the second image size and (ii) a change of image location from the first image location to the second image location.

3. The surveillance camera system of claim 2, wherein performing the video analytics further comprises:
estimating a third image size for the tracked object at a third image location based on the determined correlation, wherein the third image location is different from the first and second image locations; and
displaying an indication of the estimated third image size at the third image location on a video image frame.

4. The surveillance camera system of claim 2, wherein the performing the video analytics further comprises:
receiving a third video image frame showing an image of a second object at a third image location, wherein the image of the second object has a third image size; and
estimating a fourth image size for the second object at a fourth image location based on the determined correlation.

5. The surveillance camera system of claim 1, wherein:
the logic device is further configured to store the image frame,
the representations of the association between the first plurality of image locations are depicted using a first type of outlines, and
the representations associated with the image sizes of the tracked object at the second plurality of image locations are depicted using a second type of outlines.

6. The surveillance camera system of claim 5, wherein:
the first type of outlines comprises solid outlines;
the second type of outlines comprises broken outlines;
the determining the plurality of additional associations further comprises:
   determining a change of image size for a change of image location from the first image location to a third image location based on the association.

7. The surveillance camera system of claim 1, wherein the logic device is further configured to:
receive a user input for a master parameter for the video analytics; and
adjust one or more video analytics parameters in response to the master parameter.

8. The surveillance camera system of claim 7, wherein the one or more video analytics parameters include tolerance, hysteresis parameters, and thresholds.

9. The surveillance camera system of claim 1, wherein the performing the video analytics further comprises:
receiving a first video image frame showing an image of a second object in the scene;
determining the second object leaves the scene based on a second video image frame;
receiving a third video image frame showing an image of a third object in the scene; and
determining whether the third object is the second object based on the correlation.

10. A method, comprising:
receiving a plurality of video image frames;
performing a calibration comprising:
   tracking an object captured across a first plurality of image locations in the plurality of video image frames,
   determining an association between the first plurality of image locations and corresponding image sizes of the tracked object,
   extrapolating and/or interpolating, using a regression algorithm, the association to obtain image sizes of the tracked object at a second plurality of image locations different from the first plurality of image locations,
   determining a correlation between the first and second pluralities of image locations and the corresponding image sizes of the tracked object,
   determining a physical size of the tracked object, and
   determining a second correlation between the image sizes and the physical size; and
performing video analytics based on the second correlation and the correlation between the image locations and the corresponding image sizes of the object determined by the calibration, wherein the performing the video analytics comprises displaying, on an image frame, representations of the association between the first plurality of image locations and corresponding image sizes of the tracked object and/or representations associated with the image sizes of the tracked object at the second plurality of image locations.

11. The method of claim 10,
wherein the tracking the object comprises tracking a movement of the object from a first image location in a first video image frame to a second image location in a second video image frame;
wherein the performing the calibration further comprises determining a first image size of the tracked object in the first video image frame and a second image size of the tracked object in the second video image frame; and
wherein the association is at least between (i) a change of image size from the first image size to the second image size and (ii) a change of image location from the first image location to the second image location.

12. The method of claim 11, wherein the extrapolating and/or interpolating comprises determining a plurality of additional associations between changes of image sizes and changes of image locations based on the association.

13. The method of claim 12, wherein the determining the plurality of additional associations comprises associating no change of image size to a change of image locations parallel to a horizon of the scene.

14. The method of claim 12, wherein the determining the plurality of additional associations comprises determining a change of image size for a change of image locations from the first image location to a third image location based on the association.

15. The method of claim 11, further comprising:
receiving a user input for a master parameter for the video analytics; and adjusting one or more video analytics parameters in response to the master parameter,
wherein the performing the video analytics comprises estimating a third image size for the tracked object at a third image location based on the determined correlation.

16. The method of claim 13, further comprising receiving a user input to select the object for tracking, wherein the determining the physical size comprises receiving a user input indicative of the physical size.

17. The method of claim 13, further comprising determining a weight of the tracked object based on the physical size of the tracked object, wherein the determining the physical size comprises:
performing object recognition to identify the tracked object; and
obtaining, based on the object recognition, data indicative of the physical size of the tracked object from a database.

18. The method of claim 10, wherein the performing the calibration further comprises performing object recognition to identify a second object in one of the plurality of video image frames, wherein the second object has a known size and/or known dimension, and wherein the physical size of the tracked object is based on the known size and/or the known dimension of the second object.

19. The method of claim 10, wherein the representations are displayed on the image frame to provide an indication that the calibration has been performed.

20. The method of claim 10, further comprising:
retrieving orientation sensor data; and
determining, based on the orientation sensor data, a horizon on the plurality of video image frames, wherein the image sizes of the tracked object are further based on the horizon.

* * * * *